US010528179B2

(12) United States Patent
Kyoung et al.

(10) Patent No.: US 10,528,179 B2
(45) Date of Patent: Jan. 7, 2020

(54) TOUCH SENSING SYSTEM AND DISPLAY DEVICE INCLUDING THE SAME

(71) Applicant: LG DISPLAY CO., LTD., Seoul (KR)

(72) Inventors: Kyu-Won Kyoung, Seoul (KR); Jeong-Woo Jang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 15/852,594

(22) Filed: Dec. 22, 2017

(65) Prior Publication Data

US 2018/0188881 A1 Jul. 5, 2018

(30) Foreign Application Priority Data

Dec. 30, 2016 (KR) ........................ 10-2016-0184249

(51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/0002* (2013.01); *G06F 2203/04106* (2013.01); *G06F 2203/04111* (2013.01)

(58) Field of Classification Search
CPC .................... G06F 2203/04106; G06K 9/0002
See application file for complete search history.

(56) References Cited

U.S. PATENT DOCUMENTS

| 4,567,470 | A | * | 1/1986 | Yoshikawa | ........ H03K 17/9622 341/33 |
| 5,402,151 | A | * | 3/1995 | Duwaer | .................. G06F 3/044 178/18.05 |
| 5,528,002 | A | * | 6/1996 | Katabami | ............... G06F 3/044 178/19.06 |
| 6,690,181 | B1 | * | 2/2004 | Dowdeswell | ........ A61B 5/0537 324/691 |

(Continued)

FOREIGN PATENT DOCUMENTS

CN 105677093 A 6/2016

*Primary Examiner* — William Boddie
*Assistant Examiner* — Bipin Gyawali
(74) *Attorney, Agent, or Firm* — Seed Intellectual Property Law Group LLP

(57) ABSTRACT

The present disclosure provides a touch sensing system and a display device including the same. The touch sensing system includes: a touch screen that includes a plurality of first driving electrodes, a plurality of second driving electrodes, and a plurality of sensing electrodes; a first driving circuit that outputs a first driving signal of a pulse waveform to a respective first driving electrode of the plurality of first driving electrodes in a first sensing period; a second driving circuit that outputs a second driving signal of a frequency sweep waveform to a respective second driving electrode of the plurality of second driving electrodes in a second sensing period; a first detection circuit that detects a first sensing signal sensed by at least one of the sensing electrodes in the first sensing period; a second detection circuit that detects a second sensing signal sensed by at least one of the sensing electrodes in the second sensing period; and an inductor that is connected between the sensing electrodes and the second detection circuit in the second sensing period.

17 Claims, 10 Drawing Sheets

(56) References Cited

U.S. PATENT DOCUMENTS

| | | | |
|---|---|---|---|
| 7,084,933 B2* | 8/2006 | Oh | G02F 1/13338 |
| | | | 178/18.03 |
| 8,217,912 B2* | 7/2012 | Rofougaran | G06F 3/046 |
| | | | 178/18.01 |
| 8,508,497 B2* | 8/2013 | Rofougaran | G06F 3/044 |
| | | | 178/18.07 |
| 8,519,966 B2* | 8/2013 | Rofougaran | G06F 3/046 |
| | | | 178/18.07 |
| 8,830,201 B2* | 9/2014 | Huang | G06F 3/044 |
| | | | 178/18.06 |
| 9,158,407 B2* | 10/2015 | Coulson | G06F 3/044 |
| 9,218,073 B1* | 12/2015 | Kremin | G06F 3/044 |
| 9,285,916 B2* | 3/2016 | Xi | G06F 3/047 |
| 9,459,720 B2* | 10/2016 | Kurashima | G06F 3/0412 |
| 9,484,135 B2* | 11/2016 | Kondo | H01C 1/14 |
| 9,494,815 B2* | 11/2016 | Ma | G06F 3/041 |
| 9,519,359 B2* | 12/2016 | Jeong | G06F 3/03545 |
| 9,977,526 B1* | 5/2018 | Lee | G06F 3/0412 |
| 10,025,434 B2* | 7/2018 | Jang | G06F 3/044 |
| 10,108,285 B1* | 10/2018 | Lee | G06F 3/0416 |
| 10,126,883 B2* | 11/2018 | Coulson | G06F 3/044 |
| 10,209,846 B2* | 2/2019 | Wang | G02F 1/13338 |
| 2008/0128180 A1* | 6/2008 | Perski | G06F 3/03545 |
| | | | 178/18.03 |
| 2008/0238885 A1* | 10/2008 | Zachut | G06F 3/046 |
| | | | 345/174 |
| 2011/0007021 A1* | 1/2011 | Bernstein | G06F 3/0416 |
| | | | 345/174 |
| 2011/0248773 A1* | 10/2011 | Poupyrev | G06F 3/011 |
| | | | 327/517 |
| 2013/0076374 A1* | 3/2013 | Huang | H03K 17/9622 |
| | | | 324/618 |
| 2013/0154996 A1* | 6/2013 | Trend | G06F 3/044 |
| | | | 345/174 |
| 2014/0152621 A1* | 6/2014 | Okayama | G06F 3/0416 |
| | | | 345/174 |
| 2014/0292700 A1 | 10/2014 | Mizuhashi et al. | |
| 2015/0130749 A1* | 5/2015 | Binstead | G06F 3/0416 |
| | | | 345/174 |
| 2015/0185810 A1 | 7/2015 | Seo | |
| 2015/0234486 A1* | 8/2015 | Huang | H05K 3/4685 |
| | | | 430/319 |
| 2015/0268783 A1* | 9/2015 | Yoon | G06F 3/0414 |
| | | | 345/173 |
| 2015/0277657 A1 | 10/2015 | Azumi et al. | |
| 2016/0124562 A1* | 5/2016 | Lu | G06F 3/0412 |
| | | | 345/174 |
| 2016/0139708 A1* | 5/2016 | Tseng | G06F 3/044 |
| | | | 345/174 |
| 2017/0090658 A1* | 3/2017 | Park | G06F 3/0416 |
| 2017/0153748 A1* | 6/2017 | Choi | G06F 3/044 |
| 2017/0185218 A1* | 6/2017 | Lee | G06F 3/0416 |
| 2017/0224280 A1* | 8/2017 | Bozkurt | G01L 5/0014 |
| 2017/0269763 A1* | 9/2017 | Yang | G06F 3/0412 |
| 2017/0351359 A1* | 12/2017 | Lo | A63H 3/02 |
| 2018/0004027 A1* | 1/2018 | Lin | G02F 1/133345 |
| 2018/0095569 A1 | 4/2018 | Zhang et al. | |
| 2018/0329563 A1* | 11/2018 | Han | G06F 3/0416 |
| 2018/0348948 A1* | 12/2018 | Lee | G06F 3/044 |

* cited by examiner

TOUCH SENSING SYSTEM AND DISPLAY DEVICE INCLUDING THE SAME

CROSS REFERENCE TO RELATED APPLICATIONS

The present application claims the priority benefit of Korean Patent Application No. 10-2016-0184249 filed in Republic of Korea on Dec. 30, 2016, which is hereby incorporated by reference in its entirety for all purposes as if fully set forth herein.

BACKGROUND

Technical Field

The present disclosure relates to a touch sensing system and a display device including the same.

Description of the Related Art

Facing information society, display field of displaying electric information signals has been rapidly advanced, and accordingly, various flat display devices have been developed and used. As flat display devices, a liquid crystal display device (LCD), a plasma display panel device (PDP), an organic light emitting diode (OLED) display device and the like are used.

A touch panel as a user input device is applied to a display device and senses a user's touch.

Recently, to realize an UI (user interface)/UX (user experience), the related art touch sensing system capable of a user touch position and a user recognition as well is provided. This system employs an IR (infrared ray) type touch panel to detect of a user touch position, and a mutual capacitive type touch panel for a user recognition (or user ID).

The IR type touch panel senses an infrared ray from an IR generator and detects a user touch position.

The mutual capacitive type touch panel has a driving electrode and a sensing electrode which are formed entirely over the panel and form a single capacitor, and this capacitor is connected to a resistor and an inductor, which are located outside the panel, to form a RLC band cut filter. At a user touch, an impedance of the RLC filter is measured to recognize a user.

Since the related art touch sensing system requires both of the IR type touch panel and the mutual capacitive type touch panel, a thickness and a cost of the system increase, and a thickness and a cost of a display device using the system increase.

Further, the related art touch sensing system uses the RLC band cut filter for a user recognition. However, the RLC band cut filter has a narrow gain range (or dynamic range) for an impedance measurement due to its characteristics, and a touch detection capability is degraded.

BRIEF SUMMARY

Accordingly, the present disclosure is directed to a touch sensing system and a display device including the same that substantially obviate one or more of the problems due to limitations and disadvantages of the related art.

An advantage of the present disclosure is to provide a touch sensing system and a display device including the same that can reduce a thickness and a cost of a touch sensing system achieving a user touch position detection and a user recognition, and improve a detection capability of a user recognition.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch sensing system includes: a touch screen that includes a plurality of first driving electrodes, a plurality of second driving electrodes, and a plurality of sensing electrodes; a first driving circuit that outputs a first driving signal of a pulse waveform to a respective first driving electrode of the plurality of first driving electrodes in a first sensing period; a second driving circuit that outputs a second driving signal of a frequency sweep waveform to a respective second driving electrode of the plurality of second driving electrodes in a second sensing period; a first detection circuit that detects a first sensing signal sensed by at least one of the sensing electrodes in the first sensing period; a second detection circuit that detects a second sensing signal sensed by at least one of the sensing electrodes in the second sensing period; and an inductor that is connected between the sensing electrodes and the second detection circuit in the second sensing period.

In another aspect, a touch sensing system includes: a touch screen that includes a plurality of driving electrodes, and a plurality of sensing electrodes; a driving circuit that outputs a first driving signal of a pulse waveform to a first driving electrode of the plurality of driving electrodes in a first sensing period, and outputs a second driving signal of a frequency sweep waveform to the first driving electrode in a second sensing period; a first detection circuit that detects a first sensing signal sensed by at least one of the sensing electrodes in the first sensing period; a second detection circuit that detects a second sensing signal sensed by at least one of the sensing electrodes in the second sensing period; and an inductor that is connected between the sensing electrodes and the second detection circuit in the second sensing period.

In another aspect, a display device includes: a display panel; a touch screen that corresponds to a display region of the display panel, and includes a plurality of first driving electrodes, a plurality of second driving electrodes, and a plurality of sensing electrodes; a first driving circuit that outputs a first driving signal of a pulse waveform to a respective first driving electrode of the plurality of first driving electrodes in a first sensing period; a second driving circuit that outputs a second driving signal of a frequency sweep waveform to a respective second driving electrode of the plurality of second driving electrodes in a second sensing period; a first detection circuit that detects a first sensing signal sensed by at least one of the sensing electrodes in the first sensing period; a second detection circuit that detects a second sensing signal sensed by at least one of the sensing electrodes in the second sensing period; and an inductor that is connected between the sensing electrodes and the second detection circuit in the second sensing period.

In another aspect, a display device includes: a display panel; a touch screen that corresponds to a display region of the display panel, and includes a plurality of driving electrodes, and a plurality of sensing electrodes; a driving circuit that outputs a first driving signal of a pulse waveform to a first driving electrode of the plurality of driving electrodes in a first sensing period, and outputs a second driving signal of a frequency sweep waveform to the first driving electrode in a second sensing period; a first detection circuit that detects a first sensing signal sensed by at least one of the sensing electrodes in the first sensing period; a second detection circuit that detects a second sensing signal sensed by at least one of the sensing electrodes in the second sensing period; and an inductor that is connected between the sensing electrodes and the second detection circuit in the second sensing period.

It is to be understood that both the foregoing general description and the following detailed description are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 9 shows an example that a touch screen is formed as a touch panel;

DETAILED DESCRIPTION

Reference will now be made in detail to exemplary embodiments, examples of which are illustrated in the accompanying drawings. The same reference numbers may be used throughout the drawings to refer to the same or like parts.

[First Embodiment]

Figure 1:
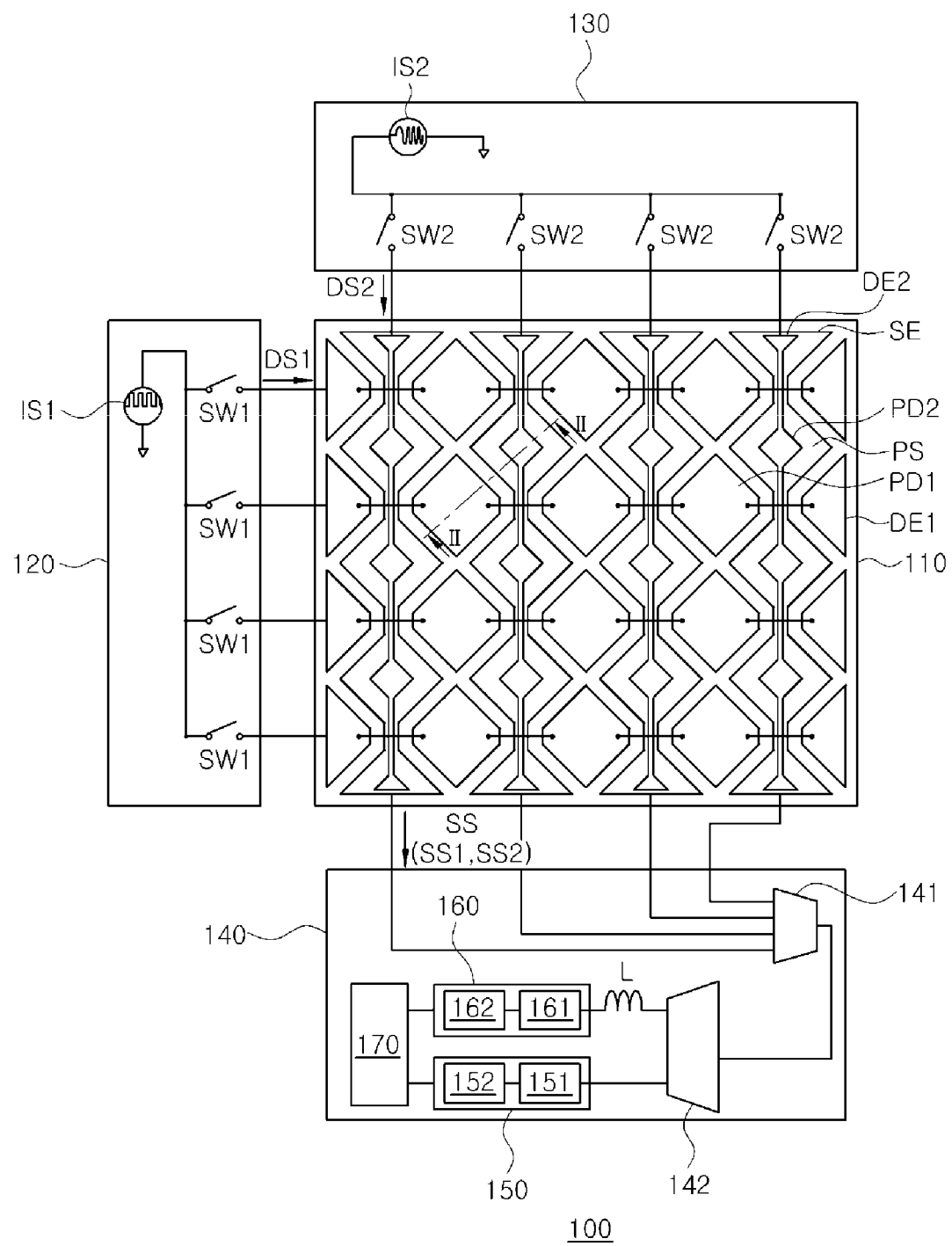
FIG. 1 is a plan view illustrating a touch sensing system according to a first embodiment of the present disclosure.
Figure 2:
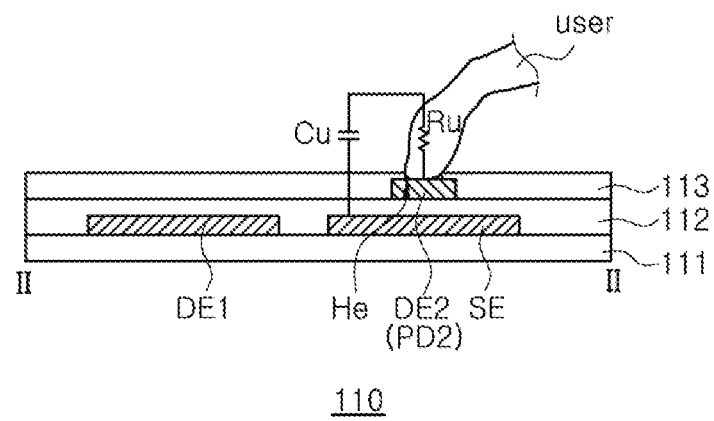
FIG. 2 is a cross-sectional view taken along a line II-II of FIG. 1.

FIG. 1 is a plan view illustrating a touch sensing system according to a first embodiment of the present disclosure, and FIG. 2 is a cross-sectional view taken along a line II-II of FIG. 1. FIG. 2 shows an example that a touch screen is formed as a touch panel.

Referring to FIG. 1, the touch sensing system 100 of this embodiment is a touch sensing system that is applied to a display device and performs a user touch position detection and a user recognition. The touch sensing system 100 includes a touch screen 110 in which driving electrodes DE1 and DE2 and sensing electrodes SE to sense a user touch are located, and a driving circuit to operate the electrodes DE1, DE2 and SE of the touch screen 110. The driving circuit includes a first driving circuit 120, a second driving circuit 130, and a read-out circuit 140.

The touch screen 110 is arranged to correspond to a display region of a display panel of a display device and senses a user touch on a display surface of the display panel. The touch screen 110 may be manufactured separately from the display panel and be attached to the display panel.

Referring to FIGS. 1 and 2, the touch screen 110 includes a plurality of first driving electrodes DE1 extending, parallel with each other, along a first direction (e.g., a horizontal direction or a X direction), and a plurality of sensing electrodes SE extending, parallel with each other, along a second direction (e.g., a vertical direction or a Y direction) crossing the first direction. The touch screen 110 further includes a plurality of second driving electrodes DE2 extending, parallel with each other, along a second direction and overlapping the plurality of sensing electrodes SE. Alternatively, the second driving electrodes DE2 may be configured to extend along the first direction while overlapping the sensing electrodes SE.

In this embodiment, an example, as shown in FIG. 2, that the first driving electrode DE1 and the sensing electrode SE are formed on a substrate 111, a dielectric layer 112 made of an insulating material is formed entirely on the substrate 111 having the first driving electrode DE1 and the sensing electrode SE, and the second electrode DE2 is formed on the dielectric layer 112 is illustrated. A protection layer 113 may be formed on the second driving electrode DE2. In this case, the first driving electrode DE1 and the sensing electrode SE are formed at the same layer, and one of them, for example, the sensing electrode SE on each horizontal line may have a connection structure along its extended direction using bridge patterns that each connect neighboring parts of the sensing electrode SE.

A configuration other than the above configuration may be employed. For example, the first driving electrode DE1 and the sensing electrode SE may be located at different layers with a dielectric layer therebetween. For other example, at least one of the first driving electrode DE1 and the sensing electrode SE may be located below the substrate 111.

The substrate 111 may be made of a glass or polymer, and may have a rigid or flexible property.

The first driving electrode DE1 may be supplied with a first driving signal DS1 to sense a mutual capacitance change between the first driving electrode DE1 and the sensing electrode SE by a user touch and detect a touch position. The first driving signal DS1 may be, for example, a driving signal of a pulse waveform, and the first driving signal DS1 may be referred to as a pulse waveform driving signal DS1.

Each first driving electrode DE1 may be configured to include a plurality of first driving electrode patterns PD1 that are arranged along the first direction and are electrically connected to each other.

Each sensing electrode SE crossing each first driving electrode DE1 to form a mutual capacitance may be configured to include a plurality of sensing electrode patterns PS that are arranged along the second direction and are electrically connected to each other.

The second driving electrode DE2 may be supplied with a second driving signal DS2 to sense an impedance change by a user touch and recognize a user (or detect a user ID). The second driving signal DS2 may be, for example, a driving signal of a frequency sweep (or sweep frequency) waveform, and the second driving signal DS2 may be referred to as a frequency sweep (or sweep frequency) driving signal DS2. The second driving signal DS2 is a band frequency driving signal in which signals in a predetermined frequency band (e.g., 10 Hz~10 MHz) are mixed.

Each second driving electrode DE2 corresponds to and overlaps each sensing electrode SE, and is configured to be exposed to the outside such that a user directly contacts the second driving electrode DE2 at a user touch. Accordingly, at a user touch, a resistor (substantially a user's resistor) Ru between the second driving electrode DE2 and the sensing electrode SE, and a capacitor Cu between a user and the sensing electrode SE are produced, and thus a RC series circuit can be produced.

It is preferable that, to minimize a mutual capacitance between the second driving electrode DE2 and the sensing electrode SE, the second driving electrode DE2 is formed to have a size, as small as possible, less than that of the sensing electrode SE. By minimizing the mutual capacitance between the second driving electrode DE2 and the sensing electrode SE, an effect, by a capacitance between the second driving electrode DE2 and the second electrode SE, on an RCL impedance in operation of the second driving electrode DE2 can be minimized, and thus a detection capability of a user recognition according to an impedance change can be improved.

Further, it is preferable that, to minimize a mutual capacitance between the second driving electrode DE2 and the first driving electrode DE1, they do not overlap each other.

Each second driving electrode DE2 may be configured to include a plurality of second driving electrode patterns PD2 that are arranged along the second direction and are electrically connected to each other. Alternatively, each second driving electrode DE may extend along the first direction.

The second driving electrode DE2 may be partially exposed to the outside for a user's contact. For example, a part of each second driving electrode pattern PD2 may be exposed. In this regard, referring to FIG. 2, an exposing hole He exposing a part of the second driving electrode pattern PD2 is formed in the protection layer 113 covering the second driving electrode pattern PD2, and thus a user can directly contact the second driving electrode pattern PD2.

The first driving circuit 120 outputs the first driving signal DS1 to the corresponding first driving electrode DE1. For example, in each frame, the first driving signal DS1 is sequentially supplied to the plurality of first driving electrodes DE1 by a predetermined period, for example, one or more horizontal period of the touch screen 110.

The first driving circuit 120 may include a first current source IS1 generating a pulse waveform signal, and a plurality of first switches SW1 that are connected to the respective first driving electrodes DE1, and switch and output the pulse waveform signal, input thereto, at respective output timings to the respective first driving electrodes DE1.

The second driving circuit 130 outputs the second driving signal DS2 to the corresponding second driving electrode DE2. For example, in each frame, the second driving signal DS2 is sequentially or simultaneously supplied to the plurality of second driving electrodes DE2 by a predetermined period, for example, one or more horizontal period of the touch screen 110.

The second driving circuit 130 may include a second current source IS2 generating a frequency sweep signal, and a plurality of second switches SW2 that are connected to the respective second driving electrodes DE2, and switch and output the frequency sweep signal, input thereto, at respective output timings to the respective second driving electrodes DE2.

The second electrode DE2 is a driving electrode operated for a user detection (i.e., a user recognition) by an impedance change (i.e., an RCL impedance change), and performs a function different from the first driving electrode DE1 for detection of a user touch position. Accordingly, it may be not necessary that the second driving signal DS2 is sequentially supplied to the plurality of second driving electrodes DE2 by a predetermined period. Thus, the second electrodes DE2 are sequentially selected and supplied with the second driving signal DS2 by a predetermined period, or are simultaneously selected and supplied with the second driving signal DS2 by a predetermined period.

The read-out circuit 140 is connected to the sensing electrodes SE, and senses analog sensing signals SS, output from the sensing electrodes SE, during a sensing period. A sensing period may be referred to herein as a sensing time. Such a "sensing time" does not imply a particular instant in time; rather, the "sensing time" is a period of time in which sensing may be performed.

The read-out circuit 140 may include a first channel selection circuit 141, a second channel selection circuit 142, a first detection circuit 150, a second detection circuit 160, an inductor L, and an analog-to-digital (AD) circuit 170.

The first channel selection circuit 141 includes a plurality of input channels connected to the respective sensing electrodes SE, and sequentially selects the plurality of input channels and outputs a signal of the selected input channel. In other words, the first channel selection circuit 141 sequentially selects the plurality of sensing electrodes SE and outputs a sensing signal SS of the selected sensing electrode SE. The first channel selection circuit 141 may be configured with a multiplexer.

The second channel selection circuit 142 is supplied with the sensing signal SS from the first channel selection circuit 141. The second channel selection circuit 142 outputs the sensing signal SS to the first detection circuit 150 through its first output channel when the sensing signal SS is a first sensing signal SS1 produced by the first driving signal DS1, and outputs the sensing signal SS to the second detection circuit 160 through its second output channel when the sensing signal SS is a second sensing signal SS2 produced by the second driving signal DS2. The second channel selection circuit 142 may be configured with a demultiplexer.

For example, in each horizontal period, during a first sensing time when the first driving signal DS1 is applied, the first sensing signal SS1 to sense a mutual capacitance is produced. The first sensing signal SS1 during the respective first sensing times are selected by the first channel selection circuit 141 and output to the second channel selection circuit 142, and during the first sensing time, the second channel selection circuit 142 transfers the first sensing signal SS1 to the first detection circuit 150.

In each horizontal period, during a second sensing time when the second driving signal DS2 is applied, the second sensing signal SS2 to sense an impedance (i.e., an RC impedance) is produced. The second sensing signals SS2 during the respective second sensing times are sequentially selected by the first channel selection circuit 141 and output to the second channel selection circuit 142, and during the second sensing time, the second channel selection circuit 142 transfers the second sensing signal SS2 to the second detection circuit 160.

The first detection circuit 150 serves to detect the first sensing signal SS1 and measure a mutual capacitance, and may include a sample hold circuit 151 and a low pass filter 152.

The sample hold circuit 151 samples and holds the first sensing signal SS1 input thereto and outputs it into a voltage signal. The low pass filter 152 removes a high frequency noise from the signal that is output from the sample hold circuit 151, and outputs the noise-removed signal.

The first detection circuit 150 is supplied with the first sensing signal SS1 and detects a mutual capacitance, and thus a user touch position according to a mutual capacitance change can be decided.

The second detection circuit 160 serves to detect the second sensing signal SS2 and measure an impedance change (i.e., an RCL impedance change), and may include a transimpedance amplifier 161 and a log amplifier 162.

The transimpedance amplifier 161 amplifies the second sensing signal SS2 input thereto and output the amplified signal into a voltage signal. The log amplifier 162 detects and outputs a magnitude component (i.e., an envelope) of the signal input thereto.

Figure 3:
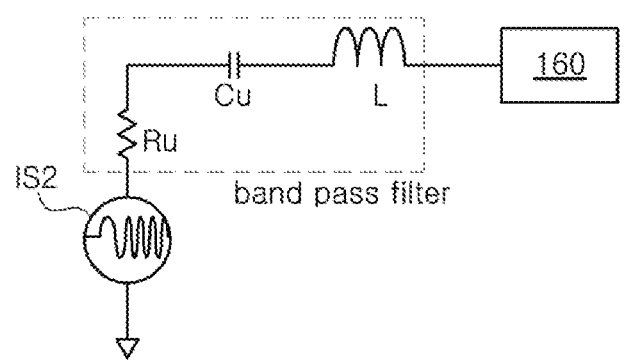
FIG. 3 is a circuit diagram illustrating an RCL series circuit produced in the touch sensing system according to the first embodiment of the present disclosure.

The inductor L is connected between the second detection circuit 160 and the second channel selection circuit 142, and is connected electrically in series to the sensing electrode SE during the second sensing time when the second sensing signal SS2 is input. Accordingly, referring to FIG. 3, the inductor L is connected in series to a user's resistor Ru and a user's capacitor Cu between the user and the sensing electrode SE, and thus an RCL series circuit is produced.

Accordingly, an RCL impedance of the RCL series circuit is reflected in the second sensing signal SS2 and this second sensing signal SS2 is input to the second detection circuit 160. Thus, the second detection circuit 160 can detect the RCL impedance, and a user ID according to an impedance change can be decided.

Further, an RCL band pass filter as the RCL series circuit is used for a user recognition, and an RCL band pass filter has a wider gain range, due to its characteristics, than that of the related art RLC band cut filter. Thus, a user recognition capability i.e., a user detection capability can be improved.

An analog detection signal detected by each of the first and second detection circuits 150 and 160 is input to the AD circuit 170, and then is converted into a digital signal and output.

Figure 4:
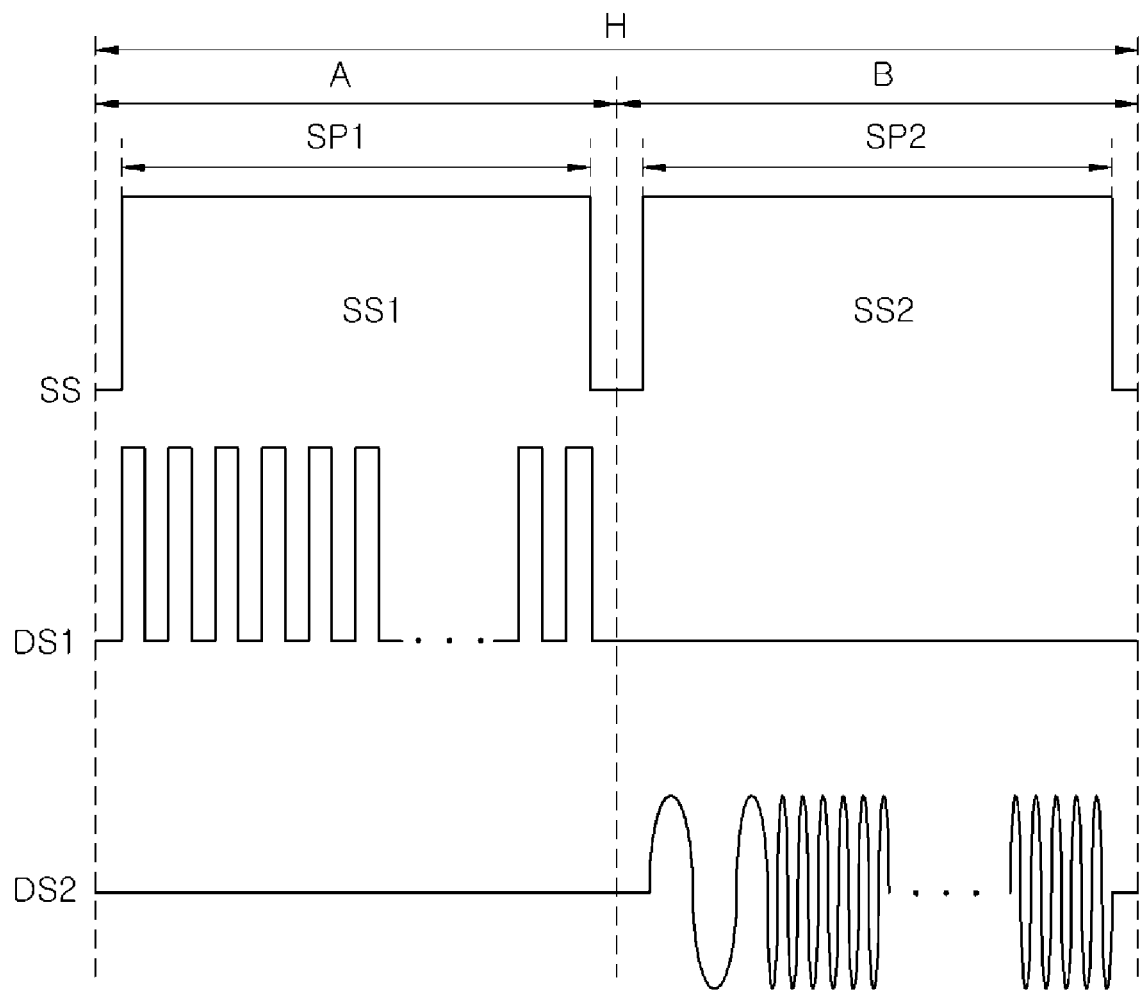
FIG. 4 is a timing chart of driving signals and a sensing signal of the touch sensing system according to the first embodiment of the present disclosure.

A method of driving the touch sensing system 100 of this embodiment is explained further with reference to FIG. 4. FIG. 4 is a timing chart of driving signals and a sensing signal of the touch sensing system according to the first embodiment of the present disclosure.

In each frame, both of a mutual capacitance sensing and an RCL impedance sensing may be conducted with a time division (or a time sharing) by a predetermined period, for example, a horizontal period H. Alternatively, the predetermined period for the sensing may be two or more horizontal periods of the touch screen 110.

At least part of a first half A of each horizontal period H is the first sensing time SP1, and for the first sensing time SP1, the first driving signal DS1 is applied to the first driving electrode DE selected in the corresponding horizontal period H. At least part of a second half B of each horizontal period H is the second sensing time SP2, and for the second sensing time SP2, the second driving signal DS2 is applied to the second driving electrode DE2 selected in the corresponding horizontal period H (or all the second driving electrodes DE2). A sequence of the first sensing time SP1 and the second sensing time SP2 may be reversed.

In the first sensing time SP1, the first sensing signal SS1 i.e., a mutual capacitance sensing signal is produced by the first driving signal DS1, and is input to and detected by the first detection circuit 150.

Accordingly, a mutual capacitance by a user touch is measured and thus a user touch position is detected.

In the second sensing time SP2, the second sensing signal SS2 i.e., an RC impedance sensing signal is produced by the second driving signal DS2, the inductor L is electrically connected to the sensing electrode SE thus a RCL series circuit is made, and an RCL impedance sensing signal due to the RCL series circuit is input to and detected by the second detection circuit 160.

Accordingly, an impedance by a user touch is measured and thus a user recognition is achieved.

Figure 5:
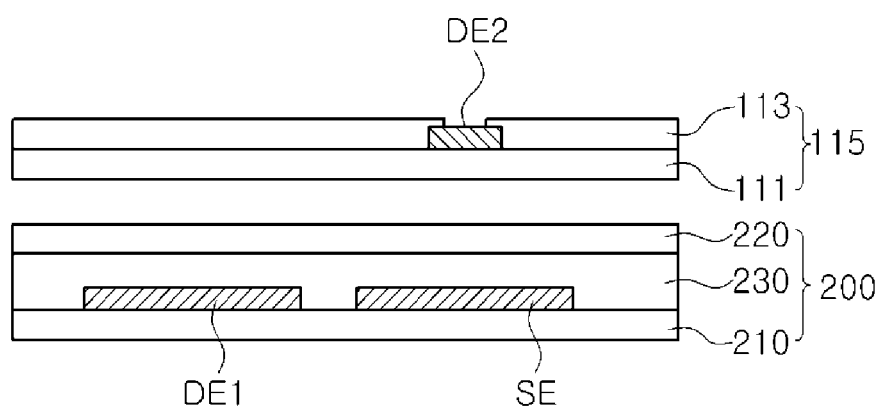
FIG. 5 is a cross-sectional view illustrating an example of a display device including a display panel and a touch panel according to the first embodiment of the present disclosure.

In this embodiment, the first driving electrode DE1 and the sensing electrode SE may be formed in a display panel. This configuration is explained with reference to FIG. 5. FIG. 5 is a cross-sectional view illustrating an example of a display device including a display panel and a touch panel according to the first embodiment of the present disclosure.

Referring to FIG. 5, a display panel 200 may use a liquid crystal panel. The display panel 200 may include an array substrate 210, and an opposing substrate 220, for example, a color filter substrate 220 facing and coupled to the array substrate 210 with a liquid crystal layer 230 therebetween. In the array substrate 210, a plurality of pixels may be arranged, in a matrix form, along a plurality of row lines and a plurality of column lines, and a pixel electrode supplied with a corresponding data signal is formed in each pixel.

A touch panel 115 is attached on the opposing substrate 220 of the display panel 200.

The first driving electrode DE1 and the sensing electrode SE of the touch screen 110 may be formed at the array substrate 210 of the display panel 200. Further, each of the first driving electrode DE1 and the sensing electrode SE may serve as a common electrode that faces a pixel electrode to operate liquid crystal molecules of the liquid crystal layer 230.

The second driving electrode DE2 may be formed at the touch panel 115.

As such, the first driving electrode DE1 and the sensing electrode SE may be formed in an in-cell structure and serve as a common electrode supplied with a common voltage. In this case, per a frame, an image display, and a mutual capacitance sensing and an impedance sensing may be performed with a time division (or a time sharing).

Figure 6:
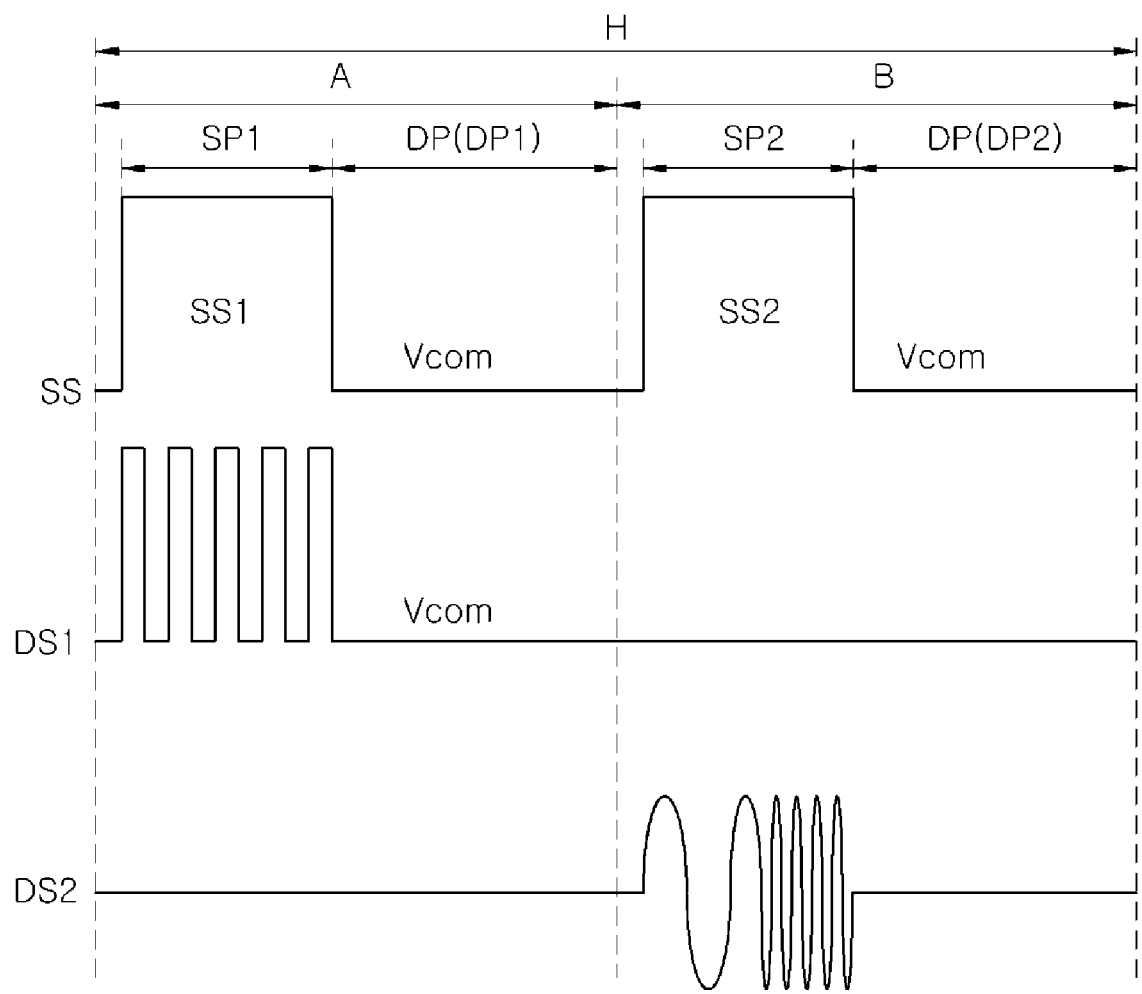
FIG. 6 is a timing chart of first and second driving signals and a sensing signal in an example that a first driving electrode and a sensing electrode of a touch screen is formed in a display panel according to the first embodiment of the present disclosure.

This is explained further with reference to FIG. 6, which is a timing chart of first and second driving signals and a sensing signal in an example that a first driving electrode and a sensing electrode of a touch screen is formed in a display panel according to the first embodiment of the present disclosure.

Referring to FIG. 6, per a frame, in each horizontal period H, the first sensing time SP1 as a mutual capacitance sensing time, the second sensing time SP2 as an impedance sensing time, and a display period DP (which may be referred to herein as a "display time") as an image display period (or "image display time") of the display panel 200 may be time-divided from each other.

For example, in a first half A of the horizontal period H, the first sensing time SP1 and the display time DP i.e., a first display time DP1 may be divided from each other in a sequence, and in a second half B of the horizontal period H, the second sensing time SP2 and the display time DP i.e., a second display time DP2 may be divided from each other in a sequence. That is, the display time DP, which may include both the first and second display times DP1, DP2, is temporally separated from the first sensing time SP1 and the second sensing time SP2. Positions of the first and second sensing times SP1 and SP2 may be reversed.

In this case, per the horizontal period H, in the first sensing time SP1, the first driving signal DS1 is applied to the first driving electrode DE1, and the first sensing signal SS1 is detected. Then, in the first display time DP1, data signals are written to pixels on corresponding row lines of the display panel 200 and an image display is performed. Then, in the second sensing time SP2, the second driving signal DS2 is applied to the second driving electrode DE2, and the second sensing signal SS2 is detected. Then, in the second display time DP2, data signals are written to pixels on corresponding row lines of the display panel 200 and an image display is performed.

During the display time DP and the second sensing time SP2, except for the first sensing time SP1, of the horizontal period H, the first driving electrode DE1 may be supplied with a common voltage Vcom. During the display time DP, except for the first and second sensing time SP1 and SP2, of the horizontal period H, the sensing electrode SE may be supplied with a common voltage Vcom. Further, during times, except for horizontal periods when sensing operations are conducted, of a frame, the first driving electrode DE1 and the sensing electrode SE may be supplied with a common voltage Vcom. In other words, in a frame, times except for the first and second sensing times SP1 and SP2 are display times, and during the display times, the first driving electrode DE1 and the sensing electrode SE may be supplied with a common voltage Vcom.

As such, in the case that the first driving electrode DE1 and the sensing electrode SE is configured with the in-cell structure, during times except for the corresponding sensing times, the common voltage Vcom is supplied, and thus the first driving electrode DE1 and the sensing electrode SE can each serve as a common electrode.

Figure 7:
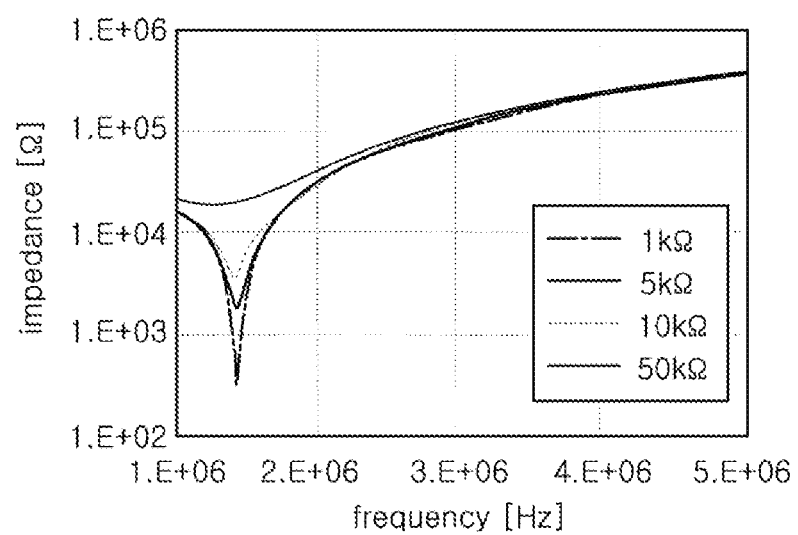
FIG. 7 is a view illustrating a user recognition by an impedance measurement according to the first embodiment of the present disclosure.

FIG. 7 is a view illustrating a user recognition by an impedance measurement according to the first embodiment of the present disclosure. FIG. 7 shows a graph of a frequency to an impedance.

Referring to FIG. 7, it is seen that at a resonance frequency of about 1.4E+06 Hz, peak values of different impedances are measured differently. Accordingly, since users have different resistors thus have different RCL impedances, by an impedance measurement, a user can be effectively recognized.

As described above, in this embodiment, the touch screen is configured using the first driving electrode applied with the first driving signal of a pulse waveform, the second driving electrode applied with the second driving signal of a frequency sweep waveform, and the sensing electrode sensing the sensing signal for each of the first and second driving signals.

Accordingly, a user touch position is determined through a mutual capacitance detection, and a user is recognized (or identified) through a RCL impedance detection.

Thus, the related art two touch panel used for a user touch position and a user recognition, respectively, is not required. Therefore, a cost and a thickness of a touch sensing system can be reduced, and a cost and a thickness of a display device using the touch sensing system can be reduced.

Further, since a RCL band pass filter, of a wide gain range, configured with a RCL series circuit is used at a RCL impedance detection, a user recognition capability can be improved.

[Second Embodiment]

The above first embodiment relates to a touch sensing system that produces an RCL series circuit at a user touch, measures its impedance, and achieves a user recognition.

This second embodiment relates to a touch sensing system that produces a CRCL series circuit at a user touch, measures its impedance, and achieves a user recognition.

For the purpose of explanations, explanations of parts similar to parts of the first embodiment may be omitted.

Figure 8:
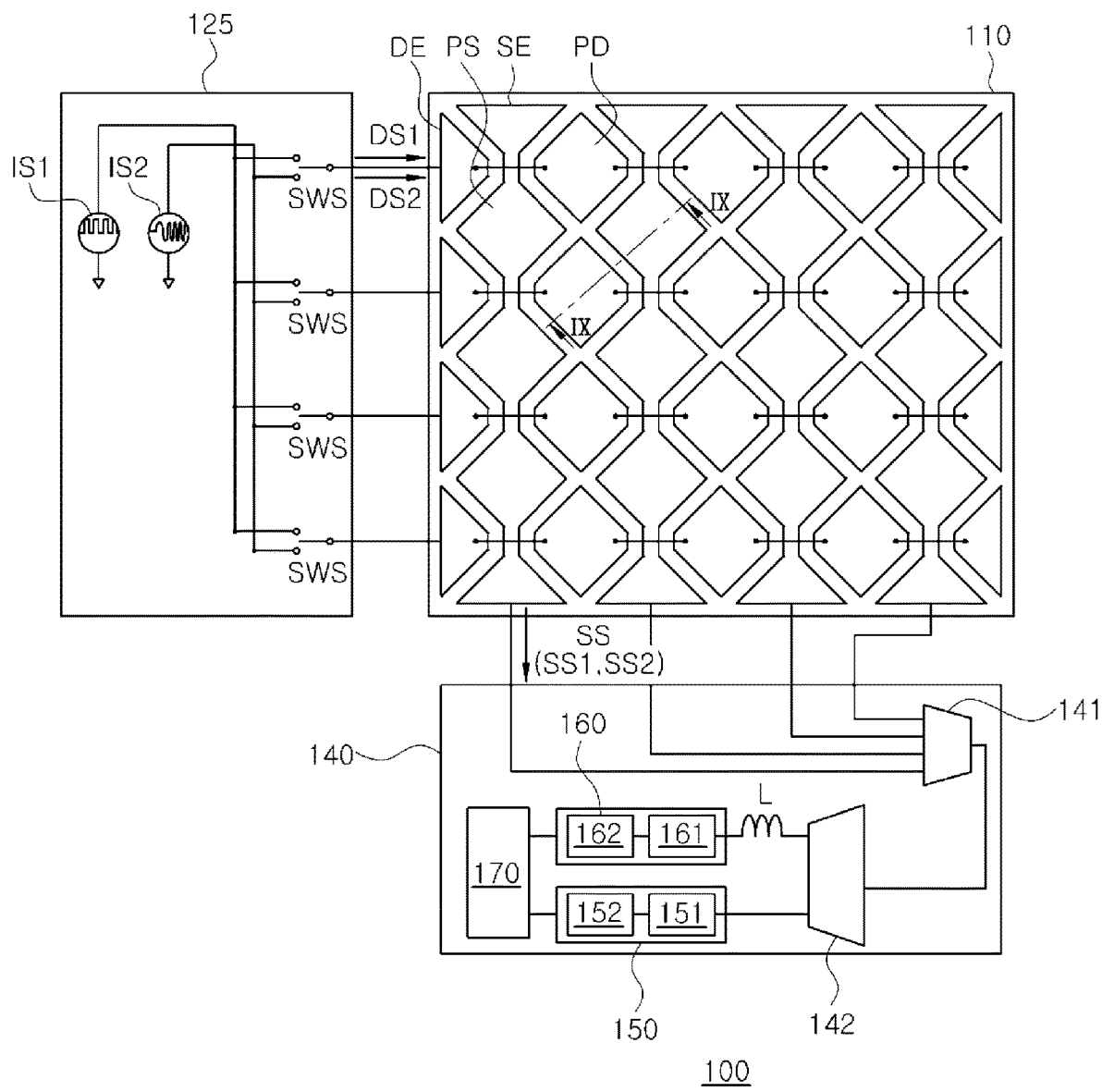
FIG. 8 is a plan view illustrating a touch sensing system according to a second embodiment of the present disclosure.
Figure 9:
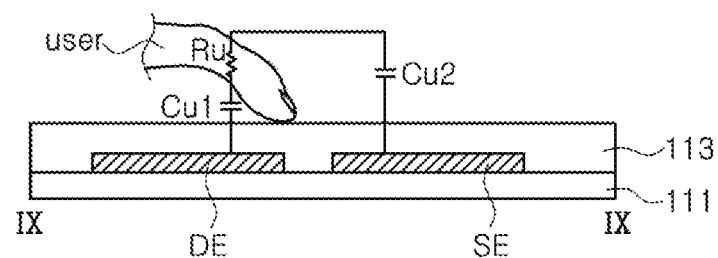
FIG. 9 is a cross-sectional view taken along a line IX-IX of FIG. 8.

FIG. 8 is a plan view illustrating a touch sensing system according to a second embodiment of the present disclosure, and FIG. 9 is a cross-sectional view taken along a line IX-IX of FIG. 8. FIG. 9 shows an example that a touch screen is formed as a touch panel.

Referring to FIG. 8, the touch sensing system 100 of this embodiment includes a touch screen 110 in which driving electrodes DE and sensing electrodes SE to sense a user touch are located, and a driving circuit to operate the electrodes DE and SE of the touch screen 110. The driving circuit includes a driving circuit 125, and a read-out circuit 140.

The touch screen 110 is arranged to correspond to a display region of a display panel of a display device and senses a user touch on a display surface of the display panel. The touch screen 110 may be manufactured separately from the display panel and be attached to the display panel.

Referring to FIGS. 8 and 9, the touch screen 110 includes a plurality of driving electrodes DE extending, parallel with each other, along a first direction (e.g., a horizontal direction or a X direction), and a plurality of sensing electrodes SE extending, parallel with each other, along a second direction (e.g., a vertical direction or a Y direction) crossing the first direction.

In this embodiment, an example, as shown in FIG. 9, that the driving electrode DE and the sensing electrode SE are formed on a substrate 111, a protection layer (or a dielectric layer) 113 made of an insulating material is formed entirely on the substrate 111 having the driving electrode DE and the sensing electrode SE.

A configuration other than the above configuration may be employed. For example, the driving electrode DE and the sensing electrode SE may be located at different layers with a dielectric layer therebetween. For other example, at least one of the driving electrode DE and the sensing electrode SE may be located below the substrate 111.

The substrate 111 may be made of a glass or polymer, and may have a rigid or flexible property.

The touch screen 110 of this embodiment does not employ the second driving electrode DE2 of the first embodiment but employs the driving electrode DE having both of the functions of the first and second driving electrodes DE1 and DE2 of the first embodiment.

Accordingly, the driving electrode DE is selectively supplied with a first driving signal DS1 of a pulse waveform to detect a mutual capacitance change and a second driving signal DS2 of a frequency sweep waveform to detect an impedance change.

In this regard, a mutual capacitance is produced between the driving electrode DE and the sensing electrode SE, and changes according to a user touch. Further, at a user touch, a capacitor Cu1 between the driving electrode DE and a user, a user's resistor Ru, and a capacitor Cu2 between a user and the sensing electrode SE are produced, and thus a CRC series circuit is produced.

Accordingly, when the first driving signal DS1 is applied, a mutual capacitance produced between the driving electrode DE and the sensing electrode SE by a user touch is detected. When the second driving signal DS2 is applied, an impedance of a CRCL series circuit produced with a CRC series circuit that is produced between the driving electrode DE and the sensing electrode SE by a user touch, and an inductor L, connected in series to the CRC series circuit, of the detection circuit 140 is detected.

Each driving electrode DE may be configured to include a plurality of driving electrode patterns PD that are arranged along the first direction and are electrically connected to each other.

Each sensing electrode SE crossing each driving electrode DE to form a mutual capacitance or an impedance may be configured to include a plurality of sensing electrode patterns PS that are arranged along the second direction and are electrically connected to each other.

The driving circuit 125 outputs the first driving signal DS1 and the second driving signal DS2 to each driving electrode DE with a time division. For example, in each frame, the driving circuit 125 supplies the first driving signal DS1 sequentially to the plurality of driving electrodes DE by a predetermined period. Further, the driving circuit 125 supplies the second driving signal DS2 sequentially or simultaneously to the plurality of driving electrodes DE by a predetermined period. The predetermined period may be, for example, one or more horizontal period of the touch screen 110.

The driving circuit 125 may include a first current source IS1 generating a pulse waveform signal, a second current source IS2 generating a frequency sweep signal, and a plurality of selection switches SWS that are connected to the respective driving electrodes DE, and selectively switch the pulse waveform signal and the frequency sweep signal at respective output timings and output the selected signals to the respective driving electrodes DE.

The driving electrode DE is operated for a user touch position by a mutual capacitance change and for a user recognition by an impedance change (i.e., an CRCL impedance change) as well. Accordingly, it may be not necessary that the second driving signal DS2 is sequentially supplied to the plurality of electrodes DE by a predetermined period. Thus, the driving electrodes DE are sequentially selected and supplied with the second driving signal DS2 by a predetermined period, or are simultaneously selected and supplied with the second driving signal DS2 by a predetermined period.

The read-out circuit 140 is connected to the sensing electrodes SE, and senses analog sensing signals SS, output from the sensing electrodes SE, during a sensing time.

The read-out circuit 140 may include a first channel selection circuit 141, a second channel selection circuit 142, a first detection circuit 150, a second detection circuit 160, an inductor L, and an analog-to-digital (AD) circuit 170.

The first channel selection circuit 141 includes a plurality of input channels connected to the respective sensing electrodes SE, and sequentially selects the plurality of input channels and outputs a signal of the selected input channel. In other words, the first channel selection circuit 141 sequentially selects the plurality of sensing electrodes SE and outputs a sensing signal SS of the selected sensing electrode SE.

The second channel selection circuit 142 is supplied with the sensing signal SS from the first channel selection circuit 141. The second channel selection circuit 142 outputs the sensing signal SS to the first detection circuit 150 through its first output channel when the sensing signal SS is a first sensing signal SS1 produced by the first driving signal DS1, and outputs the sensing signal SS to the second detection circuit 160 through its second output channel when the sensing signal SS is a second sensing signal SS2 produced by the second driving signal DS2.

For example, in each horizontal period, during a first sensing time when the first driving signal DS1 is applied, the first sensing signal SS1 to sense a mutual capacitance is produced. The first sensing signal SS1 during the respective first sensing times are selected by the first channel selection circuit 141 and output to the second channel selection circuit 142, and during the first sensing time, the second channel selection circuit 142 transfers the first sensing signal SS1 to the first detection circuit 150.

In each horizontal period, during a second sensing time when the second driving signal DS2 is applied, the second sensing signal SS2 to sense an impedance (i.e., a CRC impedance) is produced. The second sensing signals SS2 during the respective second sensing times are sequentially selected by the first channel selection circuit 141 and output to the second channel selection circuit 142, and during the second sensing time, the second channel selection circuit 142 transfers the second sensing signal SS2 to the second detection circuit 160.

The first detection circuit 150 serves to detect the first sensing signal SS1 and measure a mutual capacitance, and may include a sample hold circuit 151 and a low pass filter 152.

The first detection circuit 150 is supplied with the first sensing signal SS1 and detects a mutual capacitance, and thus a user touch position according to a mutual capacitance change can be decided.

The second detection circuit 160 serves to detect the second sensing signal SS2 and measure an impedance change (i.e., a CRCL impedance change), and may include a transimpedance amplifier 161 and a log amplifier 162.

Figure 10:
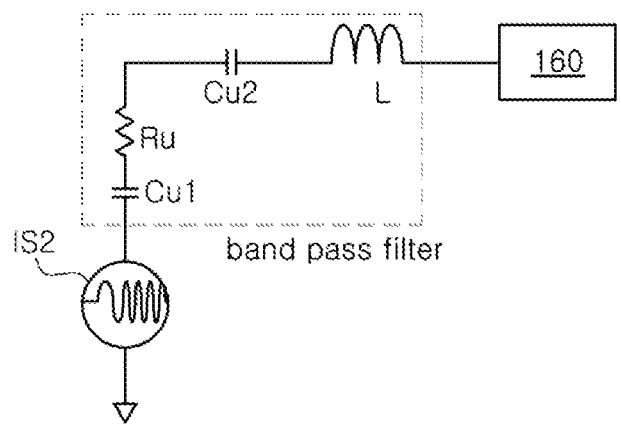
FIG. 10 is a circuit diagram illustrating an CRCL series circuit produced in the touch sensing system according to the second embodiment of the present disclosure.

The inductor L is connected between the second detection circuit 160 and the second channel selection circuit 142, and is connected electrically in series to the sensing electrode SE during the second sensing time when the second sensing signal SS2 is input. Accordingly, referring to FIG. 10, the inductor L is connected in series to a capacitor Cu1 between the driving electrode DE and the user, a user's resistor Ru and a user's capacitor Cu2 between the user and the sensing electrode SE, and thus a CRCL series circuit is produced.

Accordingly, a CRCL impedance of the CRCL series circuit is reflected in the second sensing signal SS2 and this second sensing signal SS2 is input to the second detection circuit 160. Thus, the second detection circuit 160 can detect the CRCL impedance, and a user ID according to an impedance change can be decided.

Further, a CRCL band pass filter as the CRCL series circuit is used for a user recognition, and a CRCL band pass filter is substantially an RCL band pass filter. A CRCL band pass filter has a wider gain range, due to its characteristics, than that of the related art RLC band cut filter. Thus, a user recognition capability i.e., a user detection capability can be improved.

An analog detection signal detected by each of the first and second detection circuits 150 and 160 is input to the AD circuit 170, and then is converted into a digital signal and output.

Figure 11:
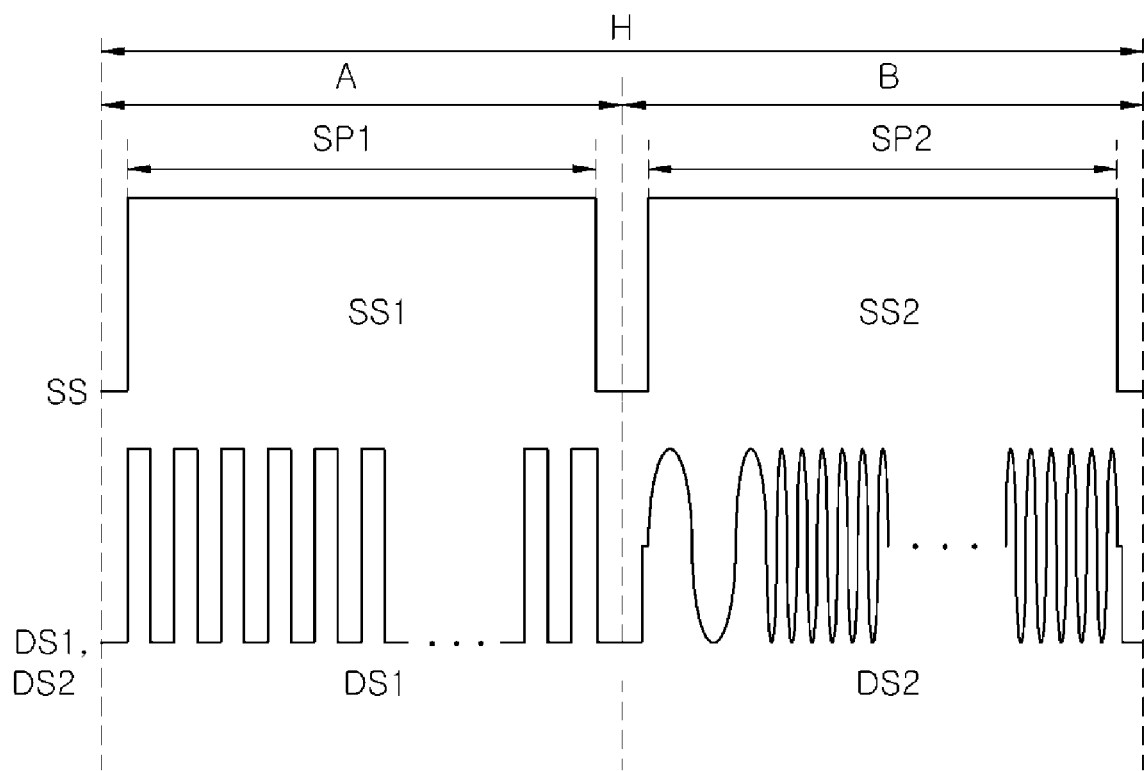
FIG. 11 is a timing chart of driving signals and a sensing signal of the touch sensing system according to the second embodiment of the present disclosure.

A method of driving the touch sensing system 100 of this embodiment is explained further with reference to FIG. 11. FIG. 11 is a timing chart of driving signals and a sensing signal of the touch sensing system according to the second embodiment of the present disclosure.

In each frame, both of a mutual capacitance sensing and an impedance sensing may be conducted with a time division (or a time sharing) by a predetermined period, for example, a horizontal period H. Alternatively, the predetermined period for the sensing may be two or more horizontal periods of the touch screen 110.

At least part of a first half A of each horizontal period H is the first sensing time SP1, and for the first sensing time SP1, the first driving signal DS1 is applied to the driving electrode DE of the corresponding horizontal period H. At least part of a second half B of each horizontal period H is the second sensing time SP2, and for the second sensing time SP2, the second driving signal DS2 is applied to the driving electrode DE of the corresponding horizontal period H (or all the driving electrodes DE). A sequence of the first sensing time SP1 and the second sensing time SP2 may be reversed.

In the first sensing time SP1, the first sensing signal SS1 i.e., a mutual capacitance sensing signal is produced by the first driving signal DS1, and is input to and detected by the first detection circuit 150.

Accordingly, a mutual capacitance by a user touch is measured and thus a user touch position is detected.

In the second sensing time SP2, the second sensing signal SS2 i.e., a CRC impedance sensing signal is produced by the second driving signal DS2, the inductor L is electrically connected to the sensing electrode SE thus a CRCL series circuit is made, and an CRCL impedance sensing signal due to the CRCL series circuit is input to and detected by the second detection circuit 160.

Accordingly, an impedance by a user touch is measured and thus a user recognition is achieved.

Figure 12:
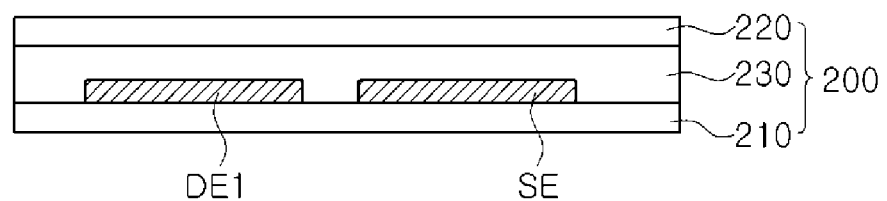
FIG. 12 is a cross-sectional view illustrating an example of a display device including a display panel and a touch panel according to the second embodiment of the present disclosure.

In this embodiment, the driving electrode DE and the sensing electrode SE may be formed in a display panel. This configuration is explained with reference to FIG. 12. FIG. 12 is a cross-sectional view illustrating an example of a display device including a display panel and a touch panel according to the second embodiment of the present disclosure.

Referring to FIG. 12, a display panel 200 may use a liquid crystal panel. The display panel 200 may include an array substrate 210, and an opposing substrate 220, for example, a color filter substrate 220 facing and coupled to the array substrate 210 with a liquid crystal layer 230 therebetween. In the array substrate 210, a plurality of pixels may be arranged, in a matrix form, along a plurality of row lines and a plurality of column lines, and a pixel electrode supplied with a corresponding data signal is formed in each pixel.

The driving electrode DE and the sensing electrode SE of the touch screen 110 may be formed at the array substrate 210 of the display panel 200. Further, each of the driving electrode DE and the sensing electrode SE may serve as a common electrode that faces a pixel electrode to operate liquid crystal molecules of the liquid crystal layer 230.

As such, the driving electrode DE and the sensing electrode SE may be formed in an in-cell structure and serve as a common electrode supplied with a common voltage. In this case, per a frame, an image display, and a mutual capacitance sensing and an impedance sensing may be performed with a time division (or a time sharing).

Figure 13:
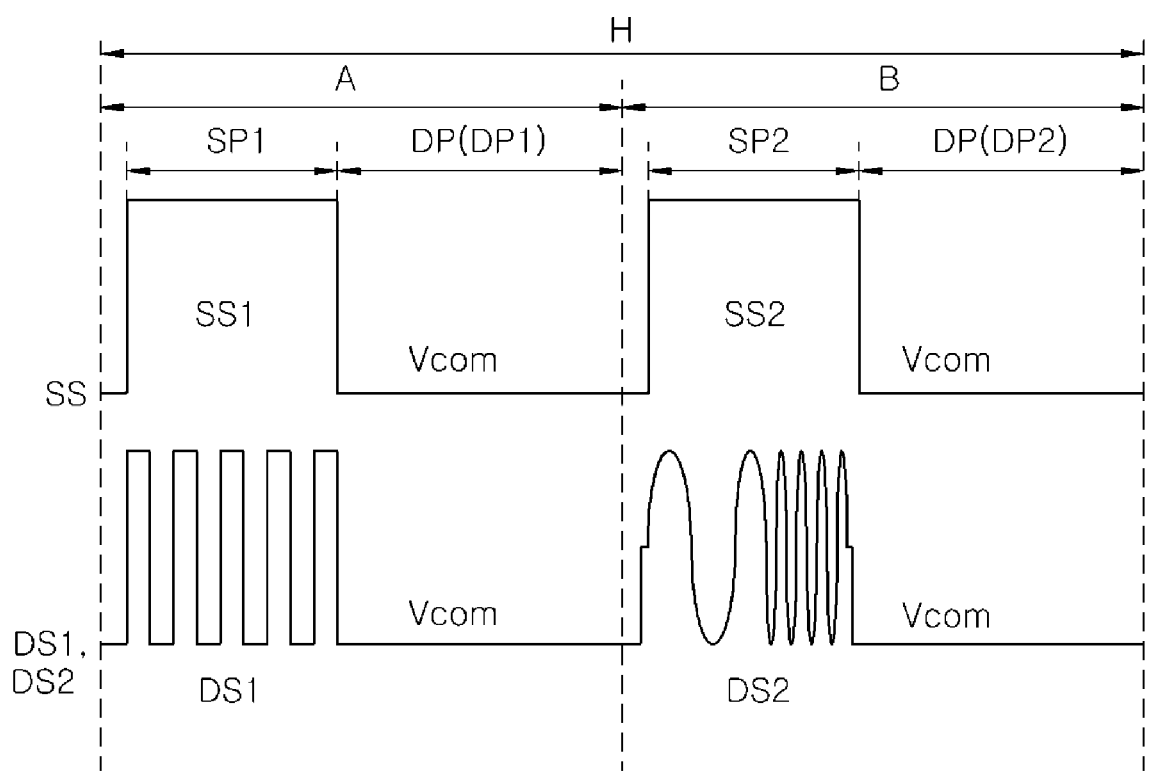
FIG. 13 is a timing chart of first and second driving signals and a sensing signal in an example that a driving electrode and a sensing electrode of a touch screen is formed in a display panel according to the second embodiment of the present disclosure.

This is explained further with reference to FIG. 13, which is a timing chart of first and second driving signals and a sensing signal in an example that a driving electrode and a sensing electrode of a touch screen is formed in a display panel according to the second embodiment of the present disclosure.

Referring to FIG. 13, per a frame, in each horizontal period H, the first sensing time SP1 as a mutual capacitance sensing time, the second sensing time SP2 as an impedance sensing time, and a display time DP as an image display time of the display panel 200 may be time-divided from each other.

For example, in a first half A of the horizontal period H, the first sensing time SP1 and the display time DP i.e., a first display time DP1 may be divided from each other in a sequence, and in a second half B of the horizontal period H, the second sensing time SP2 and the display time DP i.e., a second display time DP2 may be divided from each other in a sequence. Positions of the first and second sensing times SP1 and SP2 may be reversed.

In this case, per the horizontal period H, in the first sensing time SP1, the first driving signal DS1 is applied to the driving electrode DE, and the first sensing signal SS1 is detected. Then, in the first display time DP1, data signals are written to pixels on corresponding row lines of the display panel 200 and an image display is performed. Then, in the second sensing time SP2, the second driving signal DS2 is applied to the driving electrode DE, and the second sensing signal SS2 is detected. Then, in the second display time DP2, data signals are written to pixels on corresponding row lines of the display panel 200 and an image display is performed.

During the first and second display times DP1 and DP2, except for the first and second sensing times SP1 and SP2, of the horizontal period H, the driving electrode DE and the sensing electrode SE may be supplied with a common voltage Vcom. Further, during times, except for horizontal periods when sensing operations are conducted, of a frame, the driving electrode DE and the sensing electrode SE may be supplied with a common voltage Vcom. In other words, in a frame, times except for the first and second sensing times SP1 and SP2 are display times, and during the display times, the driving electrode DE and the sensing electrode SE may be supplied with a common voltage Vcom.

As such, in the case that the driving electrode DE and the sensing electrode SE is configured with the in-cell structure, during times except for the corresponding sensing times, the common voltage Vcom is supplied, and thus the driving electrode DE and the sensing electrode SE can each serve as a common electrode.

A structure other than the above structure of the touch screen 110 may be employed. For example, the touch screen 110 may have an on-cell structure and be configured on an outer surface of the opposing substrate 220 of the display panel 200, and in this case, the driving electrode DE and the sensing electrode SE may be formed on the outer surface of the opposing substrate 220 while manufacturing the opposing substrate 220. Further, a polarizing plate may be attached on the outer surface (i.e., a display surface of the display panel 200) of the opposing substrate having the driving electrode DE and the sensing electrode SE.

When the touch screen 110 is formed in an in-cell structure or on-cell structure, there is an advantage that a thickness of the touch screen 110 can be reduced.

As described above, in this embodiment, the touch screen is configured using the driving electrode applied with the first driving signal of a pulse waveform and the second driving signal of a frequency sweep waveform with a time division, and the sensing electrode sensing the sensing signal for each of the first and second driving signals.

Accordingly, a user touch position is determined through a mutual capacitance detection, and a user is recognized (or identified) through a CRCL impedance detection.

Thus, the related art two touch panel used for a user touch position and a user recognition, respectively, is not required. Therefore, a cost and a thickness of a touch sensing system can be reduced, and a cost and a thickness of a display device using the touch sensing system can be reduced.

Further, since a CRCL band pass filter, of a wide gain range, configured with a CRCL series circuit is used at a CRCL impedance detection, a user recognition capability can be improved.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensing system, comprising:
    a touch screen that includes a plurality of first driving electrodes, a plurality of second driving electrodes, and a plurality of sensing electrodes respectively disposed in a whole area of the touch screen;
    a first driving circuit that outputs a first driving signal of a pulse waveform to a respective first driving electrode of the plurality of first driving electrodes in a first sensing period;
    a second driving circuit that outputs a second driving signal of a frequency sweep waveform to a respective second driving electrode of the plurality of second driving electrodes in a second sensing period;
    a first detection circuit that detects a first sensing signal sensed by at least one of the sensing electrodes in the first sensing period, the first detection circuit determining a mutual capacitance by the first sensing signal to decide a user touch position;
    a second detection circuit that detects a second sensing signal sensed by at least one of the sensing electrodes in the second sensing period, the second detection circuit determining a RCL impedance by the second sensing signal to decide a user ID; and
    an inductor that is connected between the sensing electrodes and the second detection circuit in the second sensing period.

2. The touch sensing system of claim 1, wherein portions of the second driving electrodes are exposed through an exposing hole formed through a protection layer that covers the second driving electrodes.

3. The touch sensing system of claim 1, wherein the first driving circuit sequentially outputs the first driving signal to the plurality of first driving electrodes during respective horizontal periods, and wherein each horizontal period includes a respective first sensing period and a respective second sensing period.

4. The touch sensing system of claim 3, wherein the second driving circuit outputs the second driving signal to the all of the second driving electrodes during a same second sensing period.

5. The touch sensing system of claim 1, wherein the first driving electrodes and the sensing electrodes are formed on a substrate of a display panel and are supplied with a common voltage in an image display period that is temporally separated from the first and second sensing periods.

6. The touch sensing system of claim 1, wherein the first driving electrodes extend along a first direction, the sensing electrodes extend along a second direction that is transverse to the first direction, and the second driving electrodes overlap respective ones of the sensing electrodes and extend along the first or second direction.

7. A touch sensing system, comprising:
    a touch screen that includes a plurality of driving electrodes, and a plurality of sensing electrodes respectively disposed in a whole area of the touch screen;
    a driving circuit that outputs a first driving signal of a pulse waveform to a first driving electrode of the plurality of driving electrodes in a first sensing period, and outputs a second driving signal of a frequency sweep waveform to the first driving electrode in a second sensing period;
    a first detection circuit that detects a first sensing signal sensed by at least one of the sensing electrodes in the first sensing period, the first detection circuit determining a mutual capacitance by the first sensing signal to decide an user touch position;
    a second detection circuit that detects a second sensing signal sensed by at least one of the sensing electrodes in the second sensing period, the second detection circuit determining a RCL impedance by the second sensing signal to decide an user ID; and
    an inductor that is connected between the sensing electrodes and the second detection circuit in the second sensing period.

8. The touch sensing system of claim 7, wherein the driving circuit sequentially outputs the first driving signal to the plurality of driving electrodes during respective horizontal periods, and wherein each horizontal period includes a respective first sensing period and a respective second sensing period.

9. The touch sensing system of claim 7, wherein the driving electrodes and the sensing electrodes are formed on a substrate of a display panel and are supplied with a common voltage in an image display period that is temporally separated from the first and second sensing periods.

10. The touch sensing system of claim 7, wherein the driving electrodes extend along a first direction, and the sensing electrodes extend along a second direction that is transverse to the first direction.

11. A display device, comprising:
    a display panel;
    a touch screen that corresponds to a display region of the display panel, and includes a plurality of first driving electrodes, a plurality of second driving electrodes, and a plurality of sensing electrodes respectively disposed in a whole area of the touch screen;
a first driving circuit that outputs a first driving signal of a pulse waveform to a respective first driving electrode of the plurality of first driving electrodes in a first sensing period;
a second driving circuit that outputs a second driving signal of a frequency sweep waveform to a respective second driving electrode of the plurality of second driving electrodes in a second sensing period;
a first detection circuit that detects a first sensing signal sensed by at least one of the sensing electrodes in the first sensing period, the first detection circuit determining a mutual capacitance by the first sensing signal to decide an user touch position;
a second detection circuit that detects a second sensing signal sensed by at least one of the sensing electrodes in the second sensing period, the second detection circuit determining a RCL impedance by the second sensing signal to decide an user ID; and
an inductor that is connected between the sensing electrodes and the second detection circuit in the second sensing period.

12. The display device of claim 11, wherein the first driving electrodes and the sensing electrodes are formed on a substrate of the display panel and are supplied with a common voltage in an image display period that is temporally separated from the first and second sensing periods.

13. A display device, comprising:
a display panel;
a touch screen that corresponds to a display region of the display panel, and includes a plurality of driving electrodes, and a plurality of sensing electrodes respectively disposed in a whole area of the touch screen;
a driving circuit that outputs a first driving signal of a pulse waveform to a first driving electrode of the plurality of driving electrodes in a first sensing period, and outputs a second driving signal of a frequency sweep waveform to the first driving electrode in a second sensing period;
a first detection circuit that detects a first sensing signal sensed by at least one of the sensing electrodes in the first sensing period, the first detection circuit determining a mutual capacitance by the first sensing signal to decide an user touch position;
a second detection circuit that detects a second sensing signal sensed by at least one of the sensing electrodes in the second sensing period, the second detection circuit determining a RCL impedance by the second sensing signal to decide an user ID; and
an inductor that is connected between the sensing electrodes and the second detection circuit in the second sensing period.

14. The display device of claim 13, wherein the driving electrodes and the sensing electrodes are formed on a substrate of the display panel and are supplied with a common voltage in an image display period that is temporally separated from the first and second sensing periods.

15. The touch sensing system of claim 1, further comprising:
a first channel selection circuit having a plurality of input channels connected to the sensing electrode and selects one input channel of a plurality of input channels to output the first sensing signal or the second sensing signal of the selected input channel; and
a second channel selection circuit that outputs the first sensing signal to the first detection circuit when the signal detected by the sensing electrode is produced by the first driving signal and outputs the second sensing signal to the second detection circuit through the inductor when the signal detected by the sensing electrode is produced by the second driving signal.

16. The touch sensing system of claim 1, wherein each of the plurality of second driving electrodes being electrically disconnected from the second driving circuit throughout the first sensing period.

17. The touch sensing system of claim 7, further comprising a switch that selectively couples the first driving electrode to the first driving signal in the first sensing period and selectively couples the first driving electrode to the second driving signal in the second sensing period.

* * * * *